(12) United States Patent
Maupin et al.

(10) Patent No.: US 8,139,062 B2
(45) Date of Patent: Mar. 20, 2012

(54) METHOD AND SYSTEM FOR DISPLAYING A MAP USING A PROJECTED COORDINATE SYSTEM

(75) Inventors: James M. Maupin, Houston, TX (US); Philippe Robert Steinthal, Houston, TX (US); Charles W. Basden, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 1220 days.

(21) Appl. No.: 11/854,436

(22) Filed: Sep. 12, 2007

(65) Prior Publication Data

US 2009/0066695 A1  Mar. 12, 2009

(51) Int. Cl.
 *G06T 15/10* (2011.01)
 *G06T 15/20* (2011.01)
(52) U.S. Cl. .................................................. 345/427

(58) Field of Classification Search .................. None
See application file for complete search history.

(56) References Cited

U.S. PATENT DOCUMENTS

| | | | |
|---|---|---|---|
| 6,549,879 B1* | 4/2003 | Cullick et al. | 703/10 |
| 7,283,909 B1* | 10/2007 | Olsen et al. | 702/5 |
| 2002/0152053 A1* | 10/2002 | Roy et al. | 702/185 |
| 2008/0012851 A1* | 1/2008 | Bae et al. | 345/419 |
| 2008/0174593 A1* | 7/2008 | Ham et al. | 345/418 |
| 2008/0192053 A1* | 8/2008 | Howell et al. | 345/427 |
| 2008/0307498 A1* | 12/2008 | Johnson et al. | 726/3 |

* cited by examiner

*Primary Examiner* — Daniel Hajnik

(57) ABSTRACT

A computer-readable storage medium comprising instructions which when executed cause a computing device to receive a request from a client to display a map projection of a spatial reference, wherein the spatial reference comprises a location and a scale, select a projected coordinate system from a plurality of projected coordinate systems based on the spatial reference and a set of business rules, generate the map projection of the spatial reference using the projected coordinate system, and send the map projection to the client, wherein the map projection is displayed on the client.

19 Claims, 9 Drawing Sheets

METHOD AND SYSTEM FOR DISPLAYING A MAP USING A PROJECTED COORDINATE SYSTEM

BACKGROUND

Cartography is the design and production of maps, or visual representations of spatial data. In cartography, coordinate systems are used as references for locations on the Earth and/or on planar maps. For any given location on the Earth and for a given map display and scale, one or many of the more than 300 geographic coordinate systems and more than 2500 projected coordinate systems are available for use. A geographic coordinate system specifies a location on the Earth using three coordinates of a spherical coordinate system aligned with the sign axis of the Earth.

A projection is a two-dimensional representation of a three-dimensional area, and a projection may be implemented using any of the projected coordinate systems. The projected coordinate system defines one or more mathematical functions to translate the three-dimensional representation to a two-dimensional representation. For example, a projection may be used to represent the Earth, a three-dimensional object, as a planar surface, such as a map. Furthermore, flat maps require the use of map projections. Flat maps may be more useful than globes or other three-dimensional representations in many situations: they are more compact and easier to store; they readily accommodate a wide range of scales; and they are viewed easily on computer displays.

Many properties of the Earth's surface may be measured independent of its geography. For example, some properties of interest may be area, shape, direction, distance, and scale. Map projections may be constructed to preserve one or more of these properties, though not all of them simultaneously. Each projected coordinate system and the resulting map projection, preserves, compromises, or approximates the basic properties in different ways. The purpose of the map, then, determines which projected coordinate system should be utilized to generate the map projection.

A geographic information system (GIS) is a system for capturing, storing, analyzing, and managing data and associated attributes, which are spatially referenced to the earth. More generically, a GIS is a tool (e.g., a computer system) that allows users to interact with geographically-referenced information. GIS software has widespread applicability and is often used throughout science, government, business, and industry, with applications including real estate, public health, crime mapping, national defense, sustainable development, natural resources, transportation, and logistics. Furthermore, GIS software is especially pertinent to oil and gas exploration and drilling companies. Oil and gas companies may use a GIS along with geographic data to locate and explore potential drilling regions or to control operations in current oil or gas fields. Such companies demand accurate and consistent geographic data, as mistakes can be very costly in this industry.

Due to a lack of knowledgeable personnel or other resources, oil and gas companies typically use only a small percentage of the more than 2500 projected coordinate systems (e.g., sometimes less than 20). Moreover, current GIS based applications do not typically support real-time adjustments to a projected map's projected coordinate system (e.g., based on a set of applicable map projections). As a result, sub-optimal selections of projected coordinate systems for different portions of the Earth are made, causing inaccurate measurements of shape, area, distance, and directions on the map projection. Additionally, the use of incorrect or inconsistent map projections may lead to drilling operations (e.g., drilling a wellbore) being carried out several hundred meters from a desired location.

SUMMARY

In general, in one aspect, the invention relates to a computer-readable storage medium comprising instructions which when executed cause a computing device to receive a request from a client to display a map projection of a spatial reference, wherein the spatial reference comprises a location and a scale, select a projected coordinate system from a plurality of projected coordinate systems based on the spatial reference and a set of business rules, generate the map projection of the spatial reference using the projected coordinate system, and send the map projection to the client, wherein the map projection is displayed on the client.

In general, in one aspect, the invention relates to a computer-readable storage medium comprising instructions, which when executed cause a computing device to receive a first request from a client comprising a spatial reference, wherein the spatial reference comprises a location and a scale, obtain a list of projected coordinate systems from a plurality of projected coordinate systems based on the spatial reference and a set of business rules, select one projected coordinate system from the list of projected coordinate systems to obtain a first selected projected coordinate system, generate a first map projection of the spatial reference using the first selected projected coordinate system, and send the first map projection to the client, wherein the first map projection is displayed by the client.

In general, in one aspect, the invention relates to a computer-readable storage medium comprising instructions, which when executed cause a computing device to receive a first request from a client comprising a spatial reference, wherein the spatial reference comprises a location and a scale, obtain a list of projected coordinate systems from a plurality of projected coordinate systems based on the spatial reference and a set of business rules, send the list of projected coordinate systems to the client, wherein the list of projected coordinate systems is displayed on the client, receive a second request from the client, wherein the second request comprises a selected projected coordinate system, wherein the selected projected coordinate system is one selected from the list of projected coordinate systems, generate a map projection of the spatial reference using the selected projected coordinate system, and send the map projection to the client, wherein the map projection is displayed by the client.

In general, in one aspect, the invention relates to a system. The system includes a client configured to request a map projection of a spatial reference and display the map projection, wherein the spatial reference comprises a location and a scale. The system further includes a map service application configured to receive the request from the client, select a projected coordinate system from a plurality of projected coordinate systems based on the spatial reference and a set of business rules, generate the map projection of the spatial reference using the projected coordinate system, and send the map projection to the client.

In general, in one aspect, the invention relates to a system. The system includes a client configured to send a first request for a first map projection of a spatial reference and display the first map projection, wherein the spatial reference comprises a location and a scale. The system further includes a map service application configured to receive a first request from the client, obtain a list of projected coordinate systems from a plurality of projected coordinate systems based on the spatial reference and a set of business rules, select one projected coordinate system from the list of projected coordinate systems to obtain a first selected projected coordinate system, generate the first map projection of the spatial reference using the first selected projected coordinate system, and send the first map projection to the client, wherein the first map projection is displayed by the client.

In general, in one aspect, the invention relates to a map service application system that includes a storage device comprising instructions to display a map projection of a spatial reference and a processor configured to execute the instructions to perform receiving a first request from a client comprising the spatial reference, wherein the spatial reference comprises a location and a scale, obtaining a list of projected coordinate systems from a plurality of projected coordinate systems based on the spatial reference and a set of business rules, sending the list of projected coordinate systems to the client, wherein the list of projected coordinate systems is displayed on the client, receiving a second request from the client, wherein the second request comprises a selected projected coordinate system, wherein the selected projected coordinate system is one selected from the list of projected coordinate systems, generating a map projection of the spatial reference using the selected projected coordinate system, and instructions for sending the map projection to the client, wherein the map projection is displayed by the client.

In general, in one aspect, the invention relates to a process for creating a map projection of a spatial reference. The process includes receiving a request from a client to display the map projection of the spatial reference, where the spatial reference includes a location and a scale. The process further includes selecting a projected coordinate system from a plurality of projected coordinate systems based on the spatial reference and a set of business rules, generating the map projection of the spatial reference using the projected coordinate system and sending the map projection to the client, where the map projection is displayed on the client.

In general, in one aspect, the invention relates to a process for creating a first map projection of a spatial reference. The process includes receiving a first request from a client comprising the spatial reference, where the spatial reference includes a location and a scale. The process further includes obtaining a list of projected coordinate systems from a plurality of projected coordinate systems based on the spatial reference and a set of business rules, selecting one projected coordinate system from the list of projected coordinate systems to obtain a first selected projected coordinate system, and generating the first map projection of the spatial reference using the first selected projected coordinate system and sending the first map projection to the client, where the first map projection is displayed by the client.

In general, in one aspect, the invention relates to a process for creating a map projection of a spatial reference. The process includes receiving a first request from a client comprising the spatial reference, where the spatial reference comprises a location and a scale. The process further includes obtaining a list of projected coordinate systems from a plurality of projected coordinate systems based on the spatial reference and a set of business rules, sending the list of projected coordinate systems to the client, wherein the list of projected coordinate systems is displayed on the client, and receiving a second request from the client. The second request comprises a selected projected coordinate system and the selected projected coordinate system is one selected from the list of projected coordinate systems. The process further comprises generating the map projection of the spatial reference using the selected projected coordinate system and sending the map projection to the client, where the map projection is displayed by the client.

Other aspects of the invention will be apparent from the following description and the appended claims.

DETAILED DESCRIPTION

Figure 1:
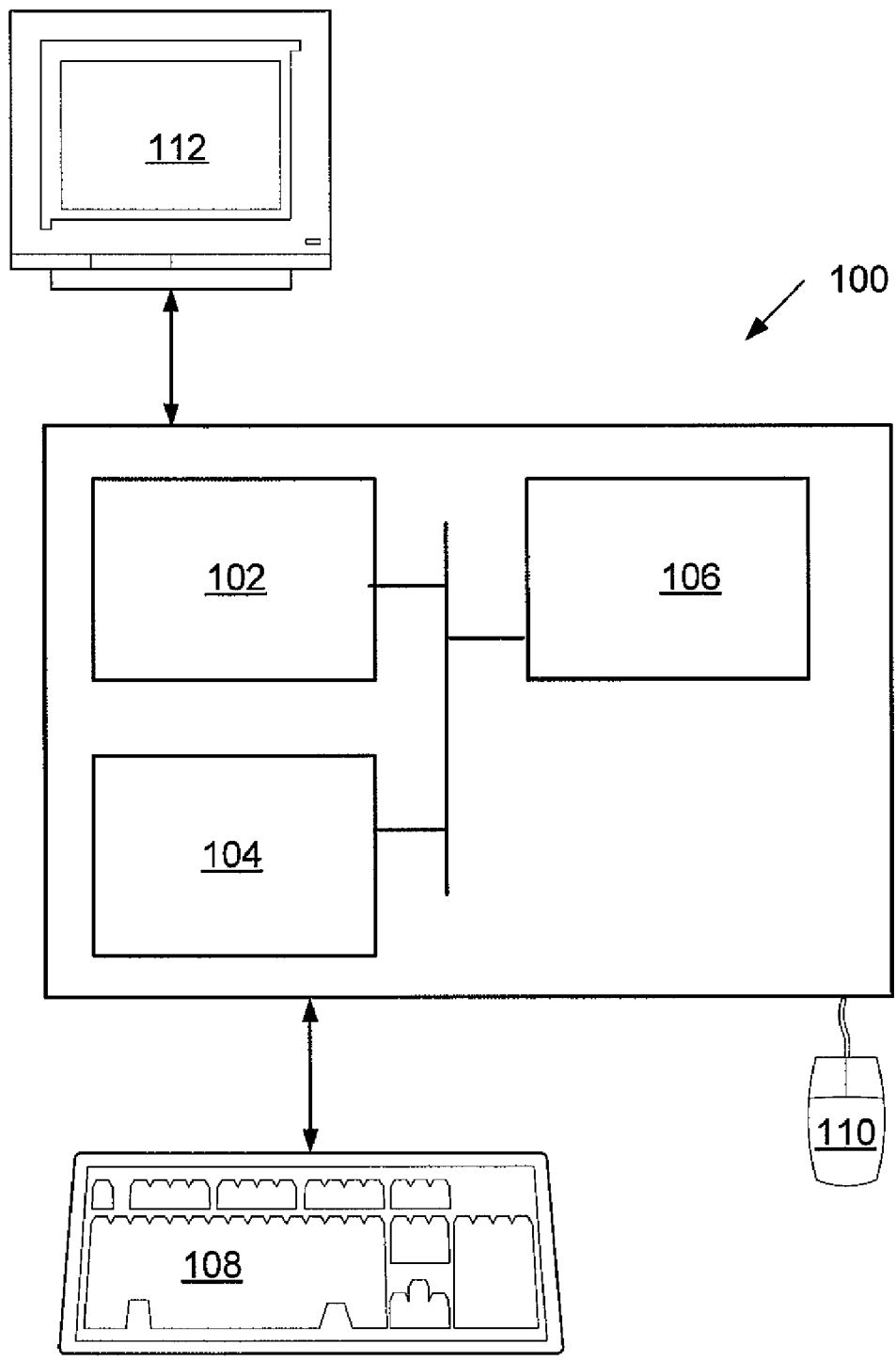
FIG. 1 shows a computer system in accordance with one or more embodiments of the invention.

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for displaying a map projection of a spatial reference. More specifically, embodiments of the invention use a spatial reference and a set of business rules to select a projected coordinate system from a plurality of projected coordinate systems. Furthermore, embodiments of the invention generate a map projection of the spatial reference, which is presented to a client.

In one embodiment of the invention, the spatial reference may correspond to any arbitrary location and the map projected generated for the location may be used to aid the user in making decisions related to (or associated with) the location. For example, the map projection displayed to the user may aid the user in making decisions related to laying a pipeline, determining where to build a road to access an oil field, how to assess or handle some environmental issue, or any other decisions which require the map projection.

In one embodiment of the invention, in a projection of geographic data, a spatial reference determines the current view of the projection of geographic data. In one embodiment of the invention, the spatial reference may include a location and a scale. In one embodiment of the invention, the location corresponds to a point or spatial boundary (e.g., a region) of interest on the Earth, and the scale corresponds to a zoom level of interest (i.e., how much detail is presented to the client). For example, at a low zoom level, only the bodies of water and mountain ranges are displayed to the client. However, at a higher zoom level, the map projection presented to the client includes streams, roads, etc. In another example, the client may request to view a map projection at the global level, continental level, regional level, etc. Those skilled in the art will appreciate that any location and scale may be of interest, and embodiments of the invention are not limited by location or scale. Said another way, the invention may be implemented using any granularity of location and scale.

In one embodiment of the invention, for every spatial reference (i.e., a location and a scale), there may be one or more projected coordinate systems that may be used to generate a map projection of the spatial reference. A user may have a preference of projected coordinate systems for any spatial reference, and such a preference may differ from the preferences of other users. Therefore, in embodiments of the invention, a set of business rules may be defined, wherein a set of business rules may define: (i) the one or more projected coordinate systems for generating a map projection for a given location and scale, and (ii) an order of precedence for one or more projected coordinate systems for a given location and scale.

In one embodiment of the invention, the great number of locations, scales, and projected coordinate systems make computer system implementations of the invention desirable. For example, the invention may be implemented on virtually any type of computer regardless of the platform being used. As shown in FIG. 1, a computer system (100) includes a processor (102), associated memory (104), a storage device (106), and numerous other elements and functionalities typical of modern computers (not shown). The computer (100) may also include input means, such as a keyboard (108) and a mouse (110), and output means, such as a monitor (112). The computer system (100) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (100) may be located at a remote location and connected to the other elements over a network.

Further, the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Figure 2:
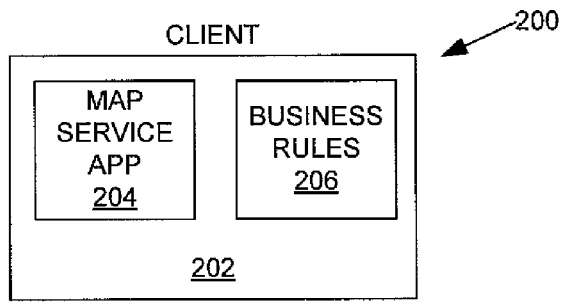
FIGS. 2-4 show a system for displaying a map projection of a spatial reference in accordance with one or more embodiments of the invention.

FIG. 2 shows a system (200) for displaying a map projection of a spatial reference in accordance with one or more embodiments of the invention. The system (200) includes a client (202) configured to interact with a user. Specifically, the client (202) may be a personal computer, such as a desktop, a terminal, or a laptop computer. More specifically, the client (202) is substantially similar to the computer system (100) shown in FIG. 1. Thus, the client (202) includes a processor, associated memory, and, optionally, a storage device. Additionally, the client (202) includes output means (e.g., an Liquid Crystal Display (LCD), a Cathode Ray Tube (CRT) Monitor, or another device configured to present the output to the user) to display a map projection and/or a list of projected coordinate systems, and input means (e.g., a keyboard, mouse, touch screen or any other device configured to allow a user to input information) allowing user input (e.g., spatial reference, selection of projected coordinate system, etc.).

Furthermore, a defined set of business rules (206) is stored in the client (202) (e.g., on the associated memory and/or storage device). The set of business rules (206) may include one or more business rules, each of which specifies at least one projected coordinate system for each of a plurality of spatial references. A spatial reference includes a location and a scale, and thus, each business rule may specify one or more projected coordinate systems for each location and scale pair. As discussed above, a location may be a point or a spatial boundary, and a scale may be any scale desired by the user (or other entity). Thus, a business rule may specify one or more projected coordinate systems for: (1) a particular spatial reference, (2) a spatial boundary and at a particular scale, (3) a range of scales, or (4) any combination thereof. Furthermore, each business rule may specify an order of precedence for the one or more projected coordinate systems. For example, if more than one projected coordinate system is applicable for a location and scale pair, then each of the applicable projected coordinate systems may be ranked in order of precedence. The set of business rules (206) may be predefined and stored in the client (202). Furthermore, each business rule may later be edited or removed, and additional business rules may later be added to the set of business rules (206).

In one or more embodiments, the set of business rules may be defined in one or more data structures. For example, the set of business rules may be implemented in a look-up table. Table 1 shows a simple example of such a look-up table and is not intended to limit the scope of the invention. Table 1 shows three scales (i.e., country, region, and sub-region), but in other embodiments the scale may be defined in any other way known in the art. Furthermore, Table 1 shows two locations (i.e., Louisiana and Texas). Again, in other embodiments, the locations may be defined in any other way known in the art. For example, the locations may be defined by geographic coordinates, cities, zip codes, etc. The look-up table may be pre-defined to meet the standards and needs of the user(s). For example, in certain regions or scales, one or more business rules may be defined such that projected coordinate systems, which preserve area, are used. In other regions or scales, one or more business rules may be defined such that projected coordinate systems, which preserve distance, are used. As shown in Table 1, each location and scale pair may have one or more projected coordinate systems defined and ranked (e.g., most preferred from top to bottom).

TABLE 1

Defined Projected Coordinate Systems

| | Spatial Reference | |
|---|---|---|
| | Texas | Netherlands |
| Sub-Region | State Plane Fips Zone 4204/NAD 83 | UTM 32/WGS-84 |
| Region | Lambert conic conformal/NAD 83 | Lambert conic conformal/ED50 |
| World | Geographic/WGS-84 | Geographic/WGS-84 |

Continuing with FIG. 2, the client (202) includes a map service application (204) stored in the associated memory or the storage device of the client (202). Furthermore, the map service application (204) is configured to execute on the processor of the client (202) to provide certain functionalities of the invention. The client (202), the map service application (204), and the set of business rules (206) are configured to interact with one another such that all functionalities of the invention may be provided by the system (200). For example, the client (202) may request a map projection of a spatial reference. The map service application (204) may use the spatial reference and the set of business rules (206) to select a projected coordinate system and generate a map projection of the spatial reference using the selected projected coordinate system. The map projection may then be sent to the client (202) and presented on the monitor of the client (202). Alternatively, the map service application (204) may obtain a list of projected coordinate systems based on the spatial reference and the set of business rules (206). The list of projected coordinate systems may then be sent to the client (202) and presented on the monitor of the client (202). Once the user selects one of the projected coordinate systems, the map projection is generated using the projected coordinate system and the spatial reference.

Alternatively, the map service application (204) may generate a first map projection of the spatial reference using a first projected coordinate system based on the order of precedence defined by the set of business rules (206). In this scenario, the user may select a second projected coordinate system from the list of projected coordinate systems (or the user may select another projected coordinate system that is not on the list of projected coordinate systems). The map service application (204) may then generate a second map projection of the spatial reference using the second projected coordinate system selected by the user. The second map projection may then be sent to the client (202) and presented on the monitor of the client (202).

Figure 3:
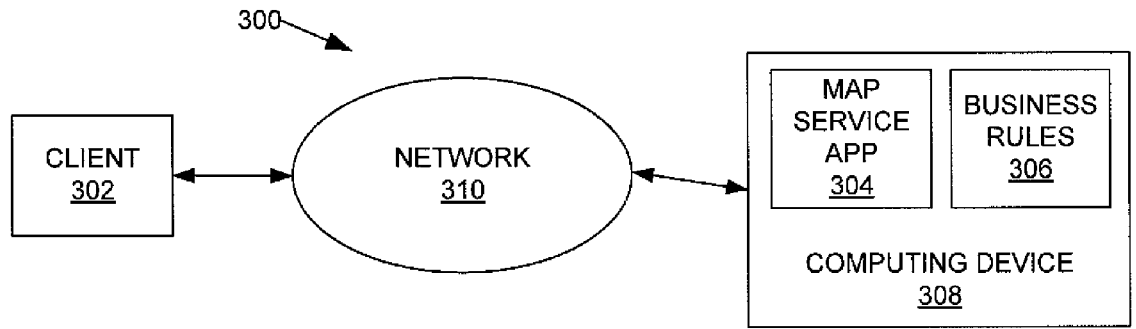

FIG. 3 shows a system (300) for displaying a map projection of a spatial reference in accordance with one or more embodiments of the invention. The system (300) includes a client (302) configured to interact with a user. Specifically, the client (302) may be a personal computer, such as a desktop, a terminal, or a laptop computer. More specifically, the client (302) is substantially similar to the computer system (100) shown in FIG. 1. Thus, the client (302) includes a processor, associated memory, and, optionally, a storage device. Additionally, the client (302) includes output means (e.g., an Liquid Crystal Display (LCD), a Cathode Ray Tube (CRT) Monitor, or another device configured to present the output to the user) to display a map projection and/or a list of projected coordinate systems and input means (e.g., a keyboard, mouse, touch screen or any other device configured to allow a user to input information) allowing user input (e.g., spatial reference, selection of projected coordinate system, etc.). Furthermore, the client (302) is connected to a network (310) (e.g., a local area network or a wide area network) via a network interface connection (not shown).

Additionally, the system (300) includes a computing device (308). The computing device (308) may be any type of computing system having a processor, associated memory and/or a storage device, including a personal computer, a server, a mainframe computer, etc. In addition, the computing device (308) is connected to the network (310). The computing device (308) includes a map service application (304) configured to execute on the processor of the computing device (308) to provide certain functionalities of the invention. Aside from being located on the computing device (308) and executing on the processor of the computing device (308), the map service application (304) is similar to the map service application (204) of system (200). Accordingly, the discussion of the map service application (204) similarly applies to the map service application (304) of system (300).

The computing device (308) also includes a set of business rules (306) that is similar to the set of business rules (206). Accordingly, the discussion of the set of business rules (206) similarly applies to the set of business rules (306). In alternative embodiments, the set of business rules (306) may instead be located on the client (302), or another computing device connected to the network (310).

In one embodiment of the invention, the client (302), the map service application (304), and the set of business rules (306) are configured to interact with one another over the network (310) such that all functionalities of the invention may be provided by system (300). Furthermore, the client (302), the map service application (304), and the set of business rules (306) may interact with one another in a manner similar to that described with respect to system (200). Accordingly, the discussion thereof similarly applies to system (300). Additionally, in one embodiment of the invention, hosting the map service application (304) on the computing device (308) allows for at least some of the required processing and storage needs to be provided by the computing device (308). Further, more than one client (302) may be connected to the network, and thus each client (302) may then access the map service application (304) on the computing device (308).

Figure 4:
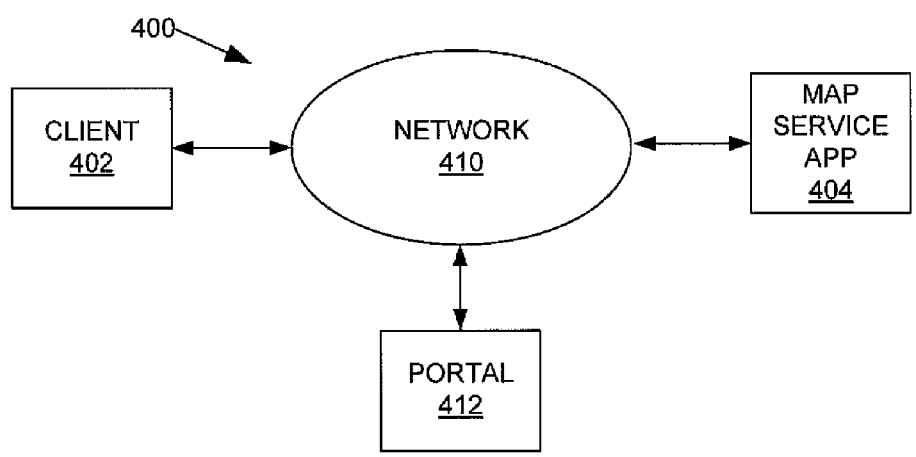

FIG. 4 shows a system (400) for displaying a map projection of a spatial reference in accordance with one or more embodiments of the invention. The third system (400) includes a client (402) connected to a network (410), and the client (402) is similar to the client (302) of system (300). As shown in FIG. 4, the system (400) includes a map service application (404) that is similar to the map service application (304). However, in the embodiment shown in FIG. 4, the client (402) does not directly interact with the map service application (404) over the network (410). Rather, the client (402) interacts with the map service application (404) indirectly through a portal (412). The web-based portal (412) and the map service application (404) are each located on one or more remote devices connected to the network (410). Additionally, a set of business rules may be located on any remote device connected to the network (410). Alternatively, the set of business rules may be incorporated into the map service application (404), the portal (412), or the client (402).

The configuration of system (400) allows for the distribution of processing and storage needs across multiple computing devices connected through the network (410). The portal (412) may facilitate the distribution of processing and storage needs such that available resources are effectively utilized. Furthermore, the portal (412) provides a level of abstraction between the client (402) and the map service application (404). The client (402), the map service application (404), the portal (412), and the set of business rules are configured to interact with one another over the network (410) such that all functionalities of the invention may be provided by system (400). The discussions of such interactions with respect to the previously discussed systems similarly apply to system (400).

Figure 5:
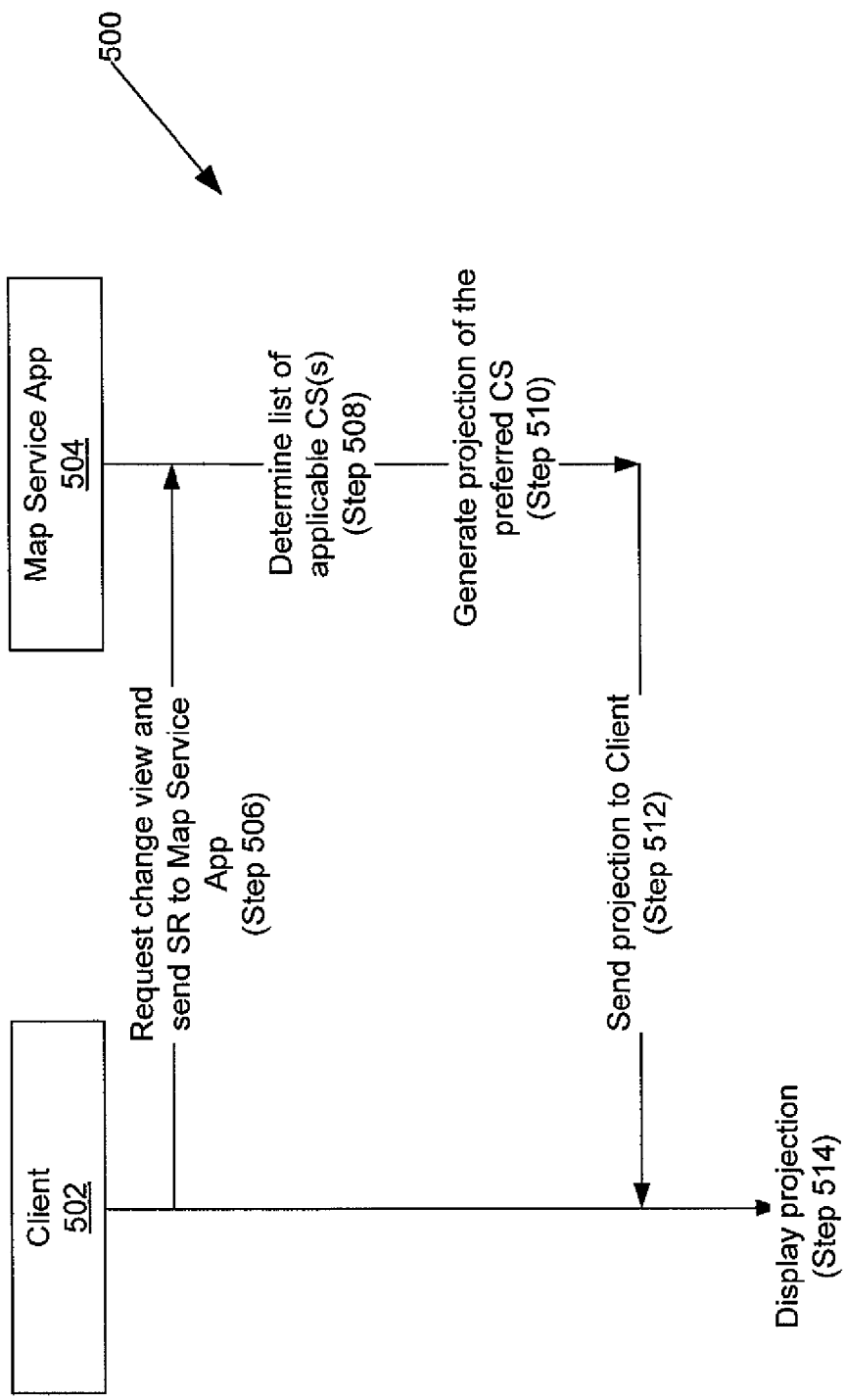
FIGS. 5-8 show a method for displaying a map projection of a spatial reference in accordance with one or more embodiments of the invention.
Figure 6:
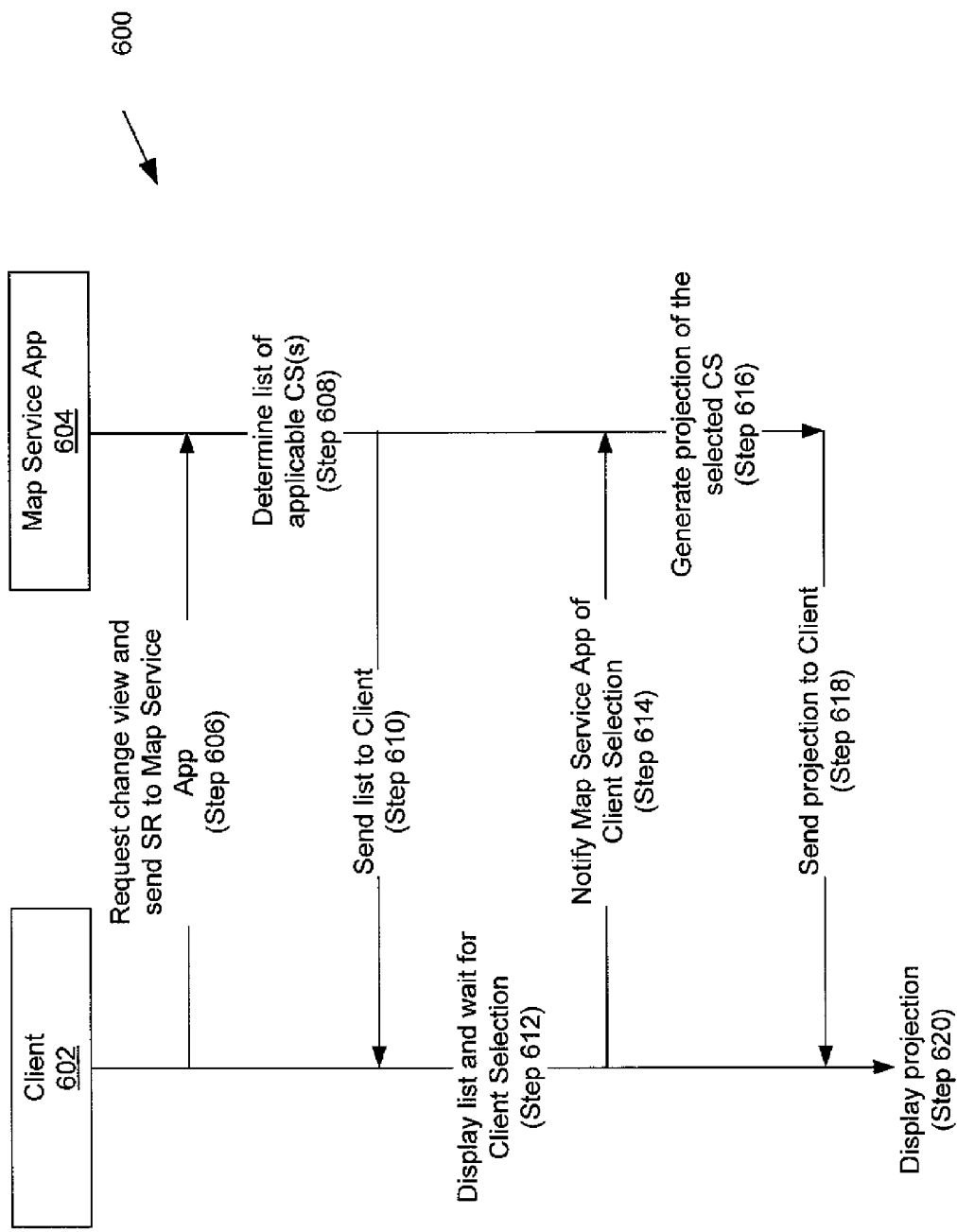
Figure 7:
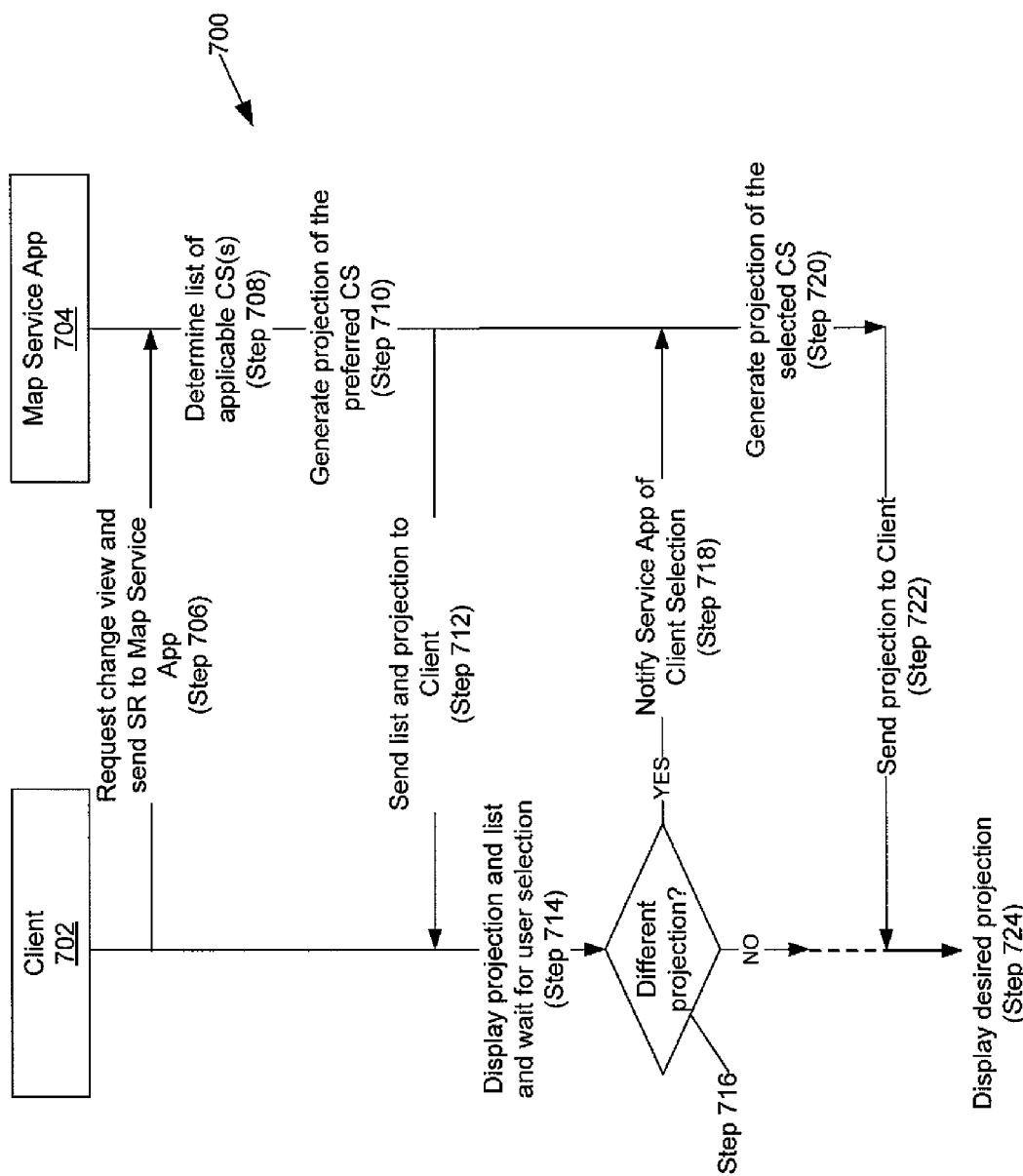

FIGS. 5-7 each show a method for displaying a map projection of a spatial reference in accordance with one or more embodiments of the invention. The methods of FIGS. 5-7 are shown in the form of sequence diagrams detailing the steps taken by a client and a map service application, and the interactions there between. Those skilled in the art will appreciate that the steps shown are not required to be completed by a client or a map service application as shown. Alternatively, the steps shown may be carried out by any element of a system configured to display a map projection of a spatial reference, such as the systems shown in FIGS. 2-4. For example, the methods may be carried out by system (300) of FIG. 4, and thus the portal (412) may carry out some of the steps shown in the methods of FIGS. 5-7. Additionally, the interactions between the client and the map service application may be interactions between any elements of a system configured to display a map projection of a spatial reference.

FIG. 5 shows a method (500) for displaying a map projection of a spatial reference in accordance with one or more embodiments of the invention. A user may view and interact with a map projection displayed on a client (502). For example, the user may change the area shown in the map projection by clicking on a location, by scrolling through the view of the map projection, or by entering coordinates (e.g., longitude and latitude) of a location of interest. Additionally, the user may change the scale of the map projection. Any of these actions may result in a request sent from the client (502) to a map service application (504) to change the view of the map projection (step 506). In addition, a spatial reference (SR) is sent from the client (502) to the map service application (504), wherein the spatial reference includes the location and the scale of interest. The map service application (504) then uses the spatial reference and a set of business rules, as previously discussed, to determine a list of one or more applicable projected coordinate systems (CS) s (step 508). The map service application (504) then selects the projected coordinate system with the highest rank from the list of applicable projected coordinate systems as defined by the set of business rules. The map service application (504) generates a map projection of the spatial reference based on the selected projected coordinate system (step 510), and then sends the map projection to the client (502) (step 512). The client (502) subsequently displays the map projection (step 514).

In one embodiment of the invention, the map service application (504) may only send the selected projected coordinate system (as opposed to the map projection). In this scenario, upon receipt of the selected projected coordinate system, the client (502) may generate the map projection. In this embodiment, the amount of data transmitted from the map service application (504) to the client (502) is minimized.

Using the above method, the user is able to view the map projection of the spatial reference of interest, wherein the map projection is based on the projected coordinate system as defined by the set of business rules. In this way, the selection of the projected coordinate system is automated, requiring no input from the user, who may not be experienced in the selection of the appropriate projected coordinate system. Furthermore, the invention allows an organization (e.g., an oil company) to define a set of business rules such that the selection of a projected coordinate system for any given spatial reference is consistent across the organization, regardless of which user is viewing the map projection.

FIG. 6 shows a method (600) for displaying a map projection of a spatial reference in accordance with one or more embodiments of the invention. Some steps shown in the second method (600) are similar to steps shown in method (500), and, accordingly, previous discussion of like steps in method (500) similarly applies here. A user may view and interact with a map projection displayed on a client (602), and a request to change the view of the map projection, including a spatial reference of interest, may be sent from the client (602) to a map service application (604) (step 606). The map service application (604) then uses the spatial reference and a set of business rules to determine a list of one or more applicable projected coordinate systems (step 608). The list of applicable projected coordinate systems is subsequently sent to the client (602) (step 610), where it is displayed to the user. If an order of precedence for the applicable projected coordinate systems has been defined in the set of business rules, then the list may be displayed in the order of precedence. Alternatively, the order of precedence may be displayed along with the list of applicable projected coordinate systems. The user may thus view the list of applicable projected coordinate systems shown in the order of precedence for the spatial reference of interest, and further select a desired applicable projected coordinate system from the list (step 612). In one embodiment of the invention, the user may select the highest ranked applicable projected coordinate system.

Once the user has selected the desired projected coordinate system, the client (602) notifies the map service application (604) of the selection (step 614). The map service application (604) then generates a map projection of the spatial reference based on the selected projected coordinate system (step 616). The generated map projection is then sent to the client (602), where it is displayed on the client (602) to the user.

In one embodiment of the invention, upon receipt of the list of applicable projected coordinate systems, the client (602) enables a user to select one of the listed projected coordinate system. Once a selection is made, the client (602) locally generates the map projection. In this embodiment, the amount of data transmitted from the map service application (504) to the client (502) is minimized.

In one embodiment of the invention, method (600) automates the determination of the list of one or more applicable projected coordinate systems and further allows the user to control upon which of the applicable projected coordinate systems the map projection of the spatial reference will be based.

FIG. 7 shows a method (700) for displaying a map projection of a spatial reference in accordance with one or more embodiments of the invention. Some steps shown in the third method (700) are similar to steps shown in method (500) and method (600). Accordingly, previous discussions of like steps in method (500) and method (600) similarly apply here. A user may view and interact with a map projection displayed on a client (702), and a request to change the view of the map projection, including a spatial reference of interest, may be sent from the client (702) to a map service application (704) (step 706). The map service application (704) then uses the spatial reference and a set of business rules to determine a list of one or more applicable projected coordinate systems (step 708). The list of applicable projected coordinate systems is in an order of precedence as defined by the set of business rules. A this stage, the map service application (704) then selects the highest ranked projected coordinate system and generates a first map projection of the spatial reference based on the first selected projected coordinate system (step 710). The map service application (704) sends both the list of applicable projected coordinate systems and the first map projection to the client (702) (step 712). Furthermore, both the list of applicable projected coordinate systems and the first map projection are displayed on the client (702) (step 714).

Further, the user may view the first map projection of the spatial reference based on the first selected, and highest ranked, projected coordinate system, as well as the list of other applicable projected coordinate systems. At this stage, the user may decide whether to keep the first map projection, or whether to select a second projected coordinate system (step 716). If the user selects a second projected coordinate system, then the client (702) notifies the map service application (704) of the selection (step 718). The map service application (704) then generates a second map projection of the spatial reference based on the second selected projected coordinate system (step 720), and the second map projection is sent to the client (702) (step 722), where it is displayed to the user (step 724). Alternatively, if the user does not select a second projected coordinate system, then the first map projection remains as the displayed map projection (step 724).

In one embodiment of the invention, all map projections are generated locally on the client (702) and only the list of applicable projected coordinate systems is transmitted between the map service application (704) and the client (702).

Figure 8:
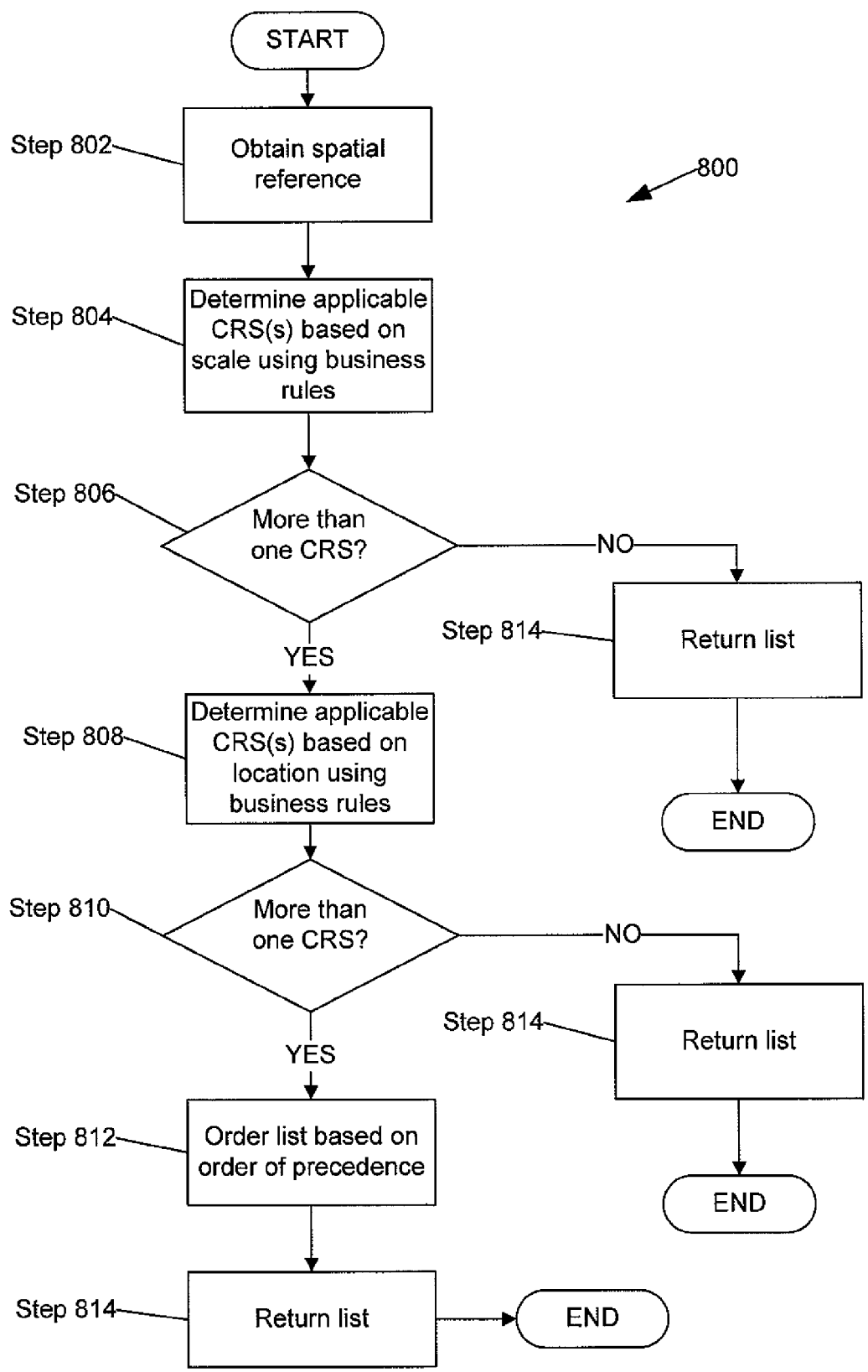

FIG. 8 shows a method (800) for obtaining a list of projected coordinate systems based on a spatial reference and a set of business rules in accordance with one or more embodiments of the invention. The method (800) may be used with the methods of FIGS. 5-7. For example, method (500) includes a step of determining a list of one or more applicable projected coordinate systems using a spatial reference and a set of business rules (step 508). The method (800) may be used to determine the list of applicable projected coordinate systems.

Initially, a spatial reference including a location and a scale is obtained (step 802). Once the spatial reference has been obtained, the input scale is used in conjunction with a set of business rules to determine the applicable projected coordinate systems for the input scale (step 804). For example, in one or more embodiments, the business rules are incorporated in a data structure (e.g., a database, a linked list, etc.) which may be searched using scale (input in step 802) to provide a list of applicable projected coordinate systems.

Next, a determination is made about whether more than one projected coordinate system is applicable for the scale (step 806). If only one projected coordinate system is applicable, then the applicable projected coordinate system, which is selected based only on the scale, is returned (step 814). It may be possible that no projected coordinate systems have been defined for the input scale, and thus some other action may be taken. In such a case, embodiments of the invention may default to a defined default projected coordinate system. Alternatively, embodiments of the invention may not allow a user to input a scale that has not been defined in the business rules (i.e., no business rule currently exists to determine an applicable projected coordinate system for the scale).

Continuing with FIG. 8, if more than one projected coordinate system is applicable for the scale, then the input location is used in conjunction with the set of business rules to potentially reduce the applicable projected coordinate systems for the spatial reference (step 808).

The result of step 808 is one or more projected coordinate systems applicable to both the input scale and location. At this stage, a determination is made about whether more than one projected coordinate system is applicable for the input scale and location (step 810). If only one projected coordinate system is applicable at the input scale and location, then the applicable projected coordinate system is returned (step 814). In some instances, it may be possible that no projected coordinate systems have been defined for the input scale and location, and thus some other action may be taken. In such a case, embodiments of the invention may default to a defined default projected coordinate system. Alternatively, embodiments of the invention may not allow a user to input a spatial reference that has not been defined in the business rules (i.e., no business rule currently exists to determine an applicable projected coordinate system for the spatial reference).

If more than one projected coordinate system is applicable for the spatial reference, then the applicable projected coordinate systems are ranked in a list based on an order of precedence defined in the set of business rules (step 812). For example, when the business rules are defined, if more than one projected coordinate system is defined for a location and scale pair, then each of the projected coordinate systems are associated with a ranking number to define an order of precedence. The list of ordered applicable projected coordinate systems is then returned (step 814).

Figure 9:
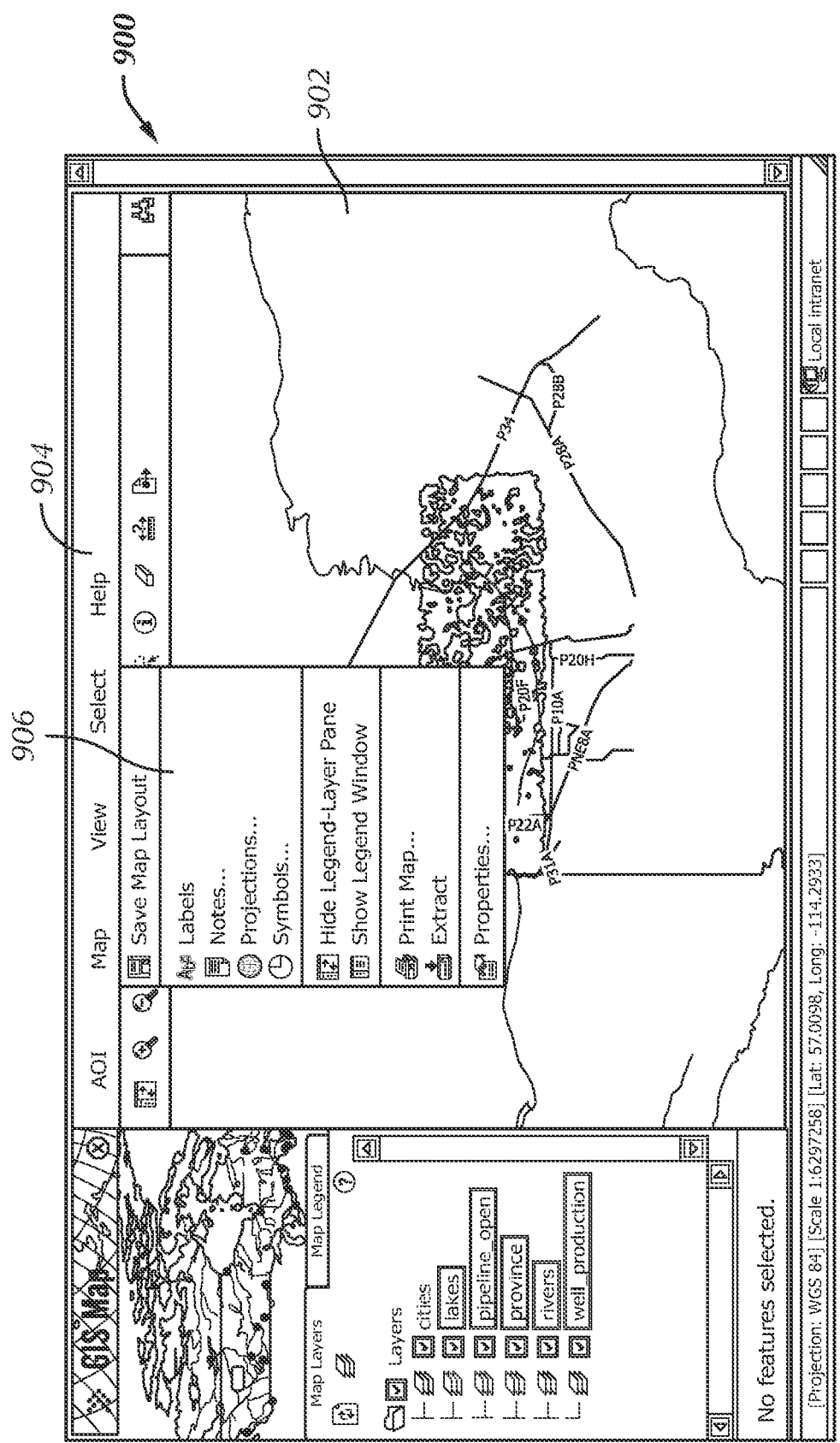
FIGS. 9-11 show an image displayed on a client in accordance with one or more embodiments of the invention.
Figure 10:
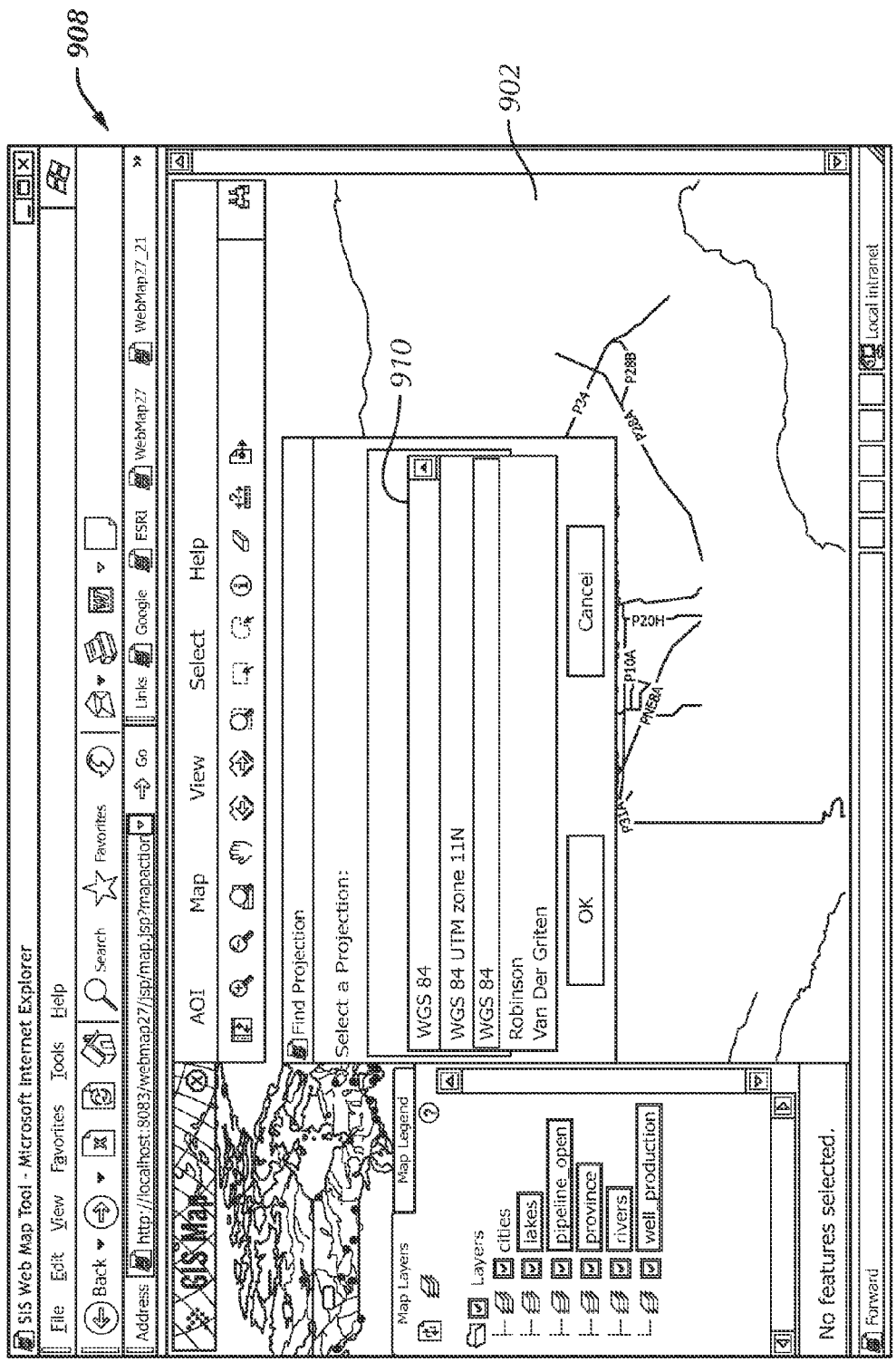
Figure 11:
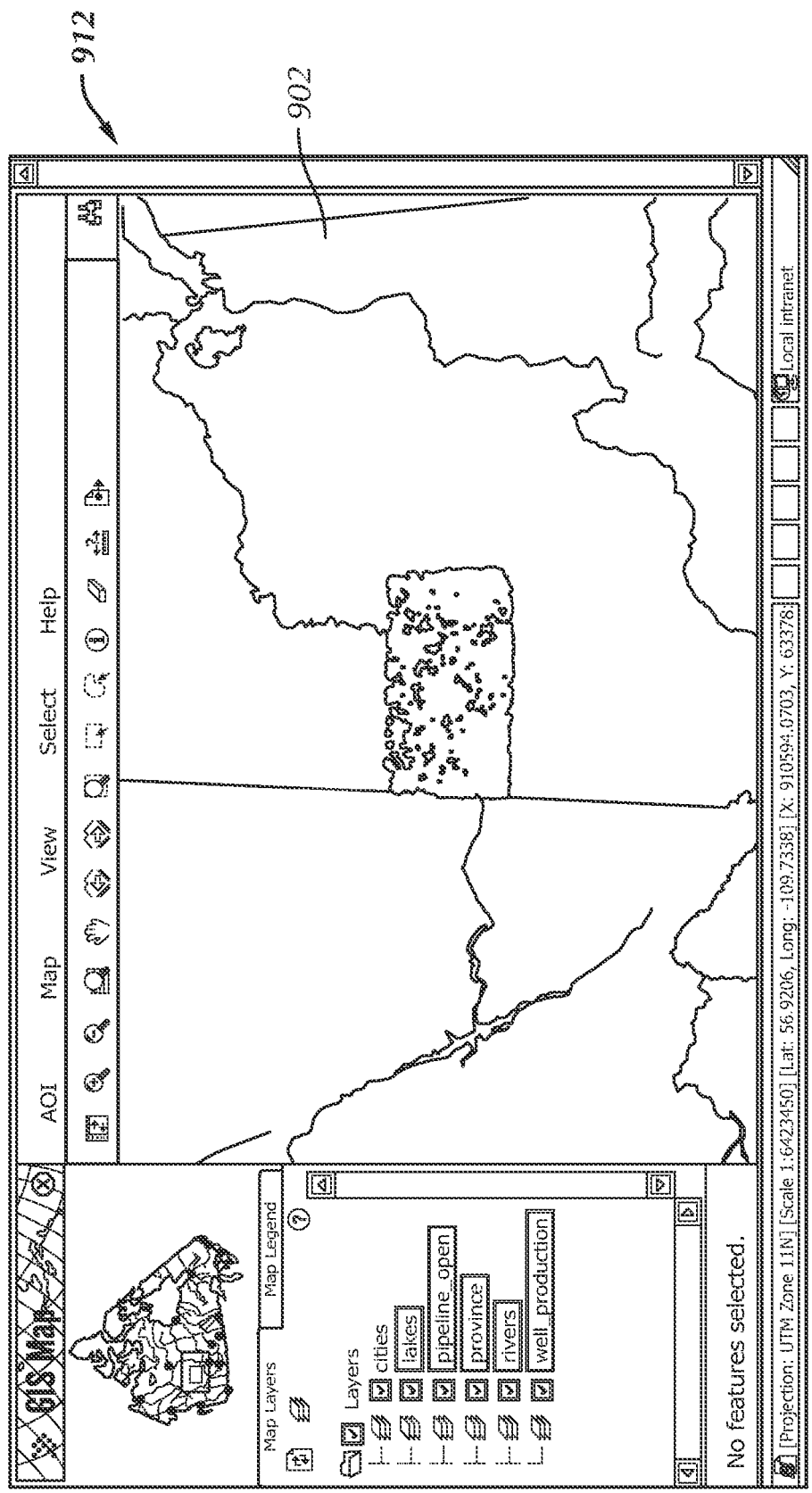

FIGS. 9-11 show a series of images displayed on a client in accordance with one embodiment of the invention. The images shown in FIG. 9-11 correspond to images obtain from a geographic information system (GIS) implementing one or more embodiments of the invention. FIGS. 9-11 are not intended to limit the scope of the invention.

FIG. 9 shows a first image (900) displayed on the client in accordance with one embodiment of the invention. The first image (900) shows a graphical user interface (GUI) of the GIS, including a map view (902), a toolbar (904), and a menu (906) of the toolbar (904). The map view (902) shows a first map projection of a specified spatial reference. The menu (906) includes a plurality of selectable options, one of which is "Projections." A user may select the "projections" option to display a list of applicable projected coordinate systems for the specified spatial reference.

Next, FIG. 10 shows a second image (908) displayed after the user has selected the "Projections" option from the menu (906). The second image (908) includes the list of applicable projected coordinate systems (910). The user may select one of the applicable projected coordinate systems such that the map view (902) shows a map projection of the specified spatial reference based on the selected projected coordinate system.

FIG. 11 shows a third image (912) displayed after the user has selected a projected coordinate system from the list of applicable coordinate systems (910). The map view (902) now shows a second map projection of the specified spatial reference based on the selected projected coordinate system.

Embodiments of the invention may facilitate automated selection of projected coordinate systems. Such selected projected coordinate systems may allow geographic data to be accurately and consistently presented to a user. Furthermore, the selection of a proper projected coordinate system using one or more embodiments of the invention does not require a user to have knowledge of such projected coordinate systems. Additionally, map projections may be adjusted in real-time. In addition, embodiments of the invention include functionality to present a list of preferred projected coordinate systems to the user.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer-readable storage medium comprising instructions which when executed cause a computing device to:
   receive a request from a client to display a map projection of a spatial reference of a plurality of spatial references, wherein each spatial reference of the plurality of spatial references comprises one of a plurality of location and scale pairs;
   automatically select, in response to the request from the client, a projected coordinate system from a plurality of projected coordinate systems based on the spatial reference and a set of business rules, wherein each business rule of the set of business rules specifies at least one projected coordinate system for each of the plurality of location and scale pairs;
   generate the map projection of the spatial reference using the projected coordinate system; and
   send the map projection to the client, wherein the map projection is displayed on the client,
   wherein each of the plurality of projected coordinate systems are ordered using a ranking number,
   wherein the ranking number and the ordering are based at least in part on the set of business rules, and
   wherein the projected coordinate system is automatically selected by choosing one of the plurality of projected coordinate systems with a highest ranking number.

2. The non-transitory computer-readable storage medium of claim 1, wherein each spatial reference corresponds to a drilling location.

3. The non-transitory computer-readable storage medium of claim 1, wherein a location of each of the plurality of location and scale pairs is a geographic location.

4. The non-transitory computer-readable storage medium of claim 1, wherein the set of business rules further specifies the plurality of projected coordinate systems for at least one of the plurality of spatial references.

5. The non-transitory computer-readable storage medium of claim 4, wherein each of the plurality of projected coordinate systems specified for the at least one of the plurality of spatial references is associated with a ranking number.

6. The non-transitory computer-readable storage medium of claim 1, wherein the map projection is used to determine a drilling location for a wellbore.

7. A non-transitory computer-readable storage medium comprising instructions, which when executed cause a computing device to:
   receive a first request from a client comprising a spatial reference of a plurality of spatial references, wherein each spatial reference of the plurality of spatial references comprises location and scale pairs;
   obtain a list of projected coordinate systems from a plurality of projected coordinate systems based on the spatial reference and a set of business rules, wherein each business rule of the set of business rules specifies at least one projected coordinate system for each of the plurality of location and scale pairs;
   automatically select, in response to the first request from the client, one projected coordinate system from the list of projected coordinate systems to obtain a first selected projected coordinate system;
   generate a first map projection of the spatial reference using the first selected projected coordinate system; and
   send the first map projection to the client, wherein the first map projection is displayed by the client,
   wherein each projected coordinate system on the list of projected coordinate systems are ordered using a ranking number,
   wherein the ranking number and the ordering are based at least in part on the set of business rules, and
   wherein the first selected projected coordinate system is automatically selected by choosing the projected coordinate system on the list of projected coordinate systems with the highest ranking number.

8. The non-transitory computer-readable storage medium of claim 7, wherein the instructions, which when executed cause a computing device to:
   send the list of projected coordinate systems to the client, wherein the list of projected coordinate systems is displayed on the client.

9. The non-transitory computer-readable storage medium of claim 7, wherein the instructions, which when executed cause a computing device to:
   receive a second request from the client, wherein the second request comprises a second selected projected coordinate system, wherein the second selected projected coordinate system is one selected from the list of projected coordinate systems;
   generate a second map projection of the spatial reference using the second selected projected coordinate system; and
   send the second map projection to the client, wherein the second map projection is displayed by the client.

10. The non-transitory computer-readable storage medium of claim 7, wherein the spatial reference corresponds to a drilling location.

11. The non-transitory computer-readable storage medium of claim 7, wherein a location of each of the plurality of location and scale pairs is a geographic region.

12. The non-transitory computer-readable storage medium of claim 7, wherein the set of business rules further specifies the plurality of projected coordinate systems for at least one of the plurality of spatial references.

13. The non-transitory computer-readable storage medium of claim 12, wherein each of the plurality of projected coordinate systems specified for the at least one of the plurality of spatial references is associated with a ranking number.

14. A non-transitory computer-readable storage medium comprising instructions, which when executed cause a computing device to:
   receive a first request from a client comprising a spatial reference of a plurality of spatial references, wherein each spatial reference of the plurality of spatial references comprises one of a plurality of location and scale pairs;
   obtain a list of projected coordinate systems from a plurality of projected coordinate systems based on the spatial reference and a set of business rules, wherein each business rule of the set of business rules specifies at least one projected coordinate system for each of the plurality of location and scale pairs;
   send the list of projected coordinate systems to the client, wherein the list of projected coordinate systems is displayed on the client;
   receive a second request from the client, wherein the second request comprises a selected projected coordinate system, wherein the selected projected coordinate system is one selected from the list of projected coordinate systems;
   generate a map projection of the spatial reference using the selected projected coordinate system; and
   send the map projection to the client, wherein the map projection is displayed by the client,
   wherein each projected coordinate system on the list of projected coordinate systems are ordered using a ranking number,
   wherein the ranking number and the ordering are based at least in part on the set of business rules, and
   wherein the selected projected coordinate system is automatically selected by choosing the projected coordinate system on the list of projected coordinate systems with the highest ranking number.

15. The non-transitory computer-readable storage medium of claim 14, wherein the spatial reference corresponds to a drilling location.

16. The non-transitory computer-readable storage medium of claim 14, wherein a location of each of the plurality of location and scale pairs is a geographic location.

17. The non-transitory computer-readable storage medium of claim 14, wherein the set of business rules further specifies the plurality of projected coordinate systems for at least one of the plurality of spatial references.

18. A system comprising:
   a client configured to request a map projection of a spatial reference of a plurality of spatial references and display the map projection, wherein each spatial reference of the plurality of spatial references comprises one of a plurality of location and scale pairs; and
   a map service application configured to:
      receive the request from the client;

automatically select, in response to the request from the client, a projected coordinate system from a plurality of projected coordinate systems based on the spatial reference and a set of business rules, wherein each business rule of the set of business rules specifies at least one projected coordinate system for each of the plurality of location and scale pairs;

generate the map projection of the spatial reference using the projected coordinate system; and send the map projection to the client, wherein each of the plurality of projected coordinate systems are ordered using a ranking number, wherein the ranking number and the ordering are based at least in part on the set of business rules, and wherein the projected coordinate system is automatically selected by choosing one of the plurality of projected coordinate systems with a highest ranking number.

19. A process for creating a map projection of a spatial reference comprising:

receiving a request from a client to display the map projection of the spatial reference of a plurality of spatial references, wherein each spatial reference of the plurality of spatial references comprises one of a plurality of location and scale pairs;

automatically selecting, using a computer processor and in response to the request from the client, a projected coordinate system from a plurality of projected coordinate systems based on the spatial reference and a set of business rules, wherein each business rule of the set of business rules specifies at least one projected coordinate system for each of the plurality of location and scale pairs;

generating, using the computer processor, the map projection of the spatial reference using the projected coordinate system; and sending, using the computer processor, the map projection to the client, wherein the map projection is displayed on the client, wherein each of the plurality of projected coordinate systems are ordered using a ranking number, wherein the ranking number and the ordering are based at least in part on the set of business rules, and wherein the projected coordinate system is automatically selected by choosing one of the plurality of projected coordinate systems with a highest ranking number.

\* \* \* \* \*